United States Patent
Yamamoto

(10) Patent No.: US 9,826,758 B2
(45) Date of Patent: Nov. 28, 2017

(54) FEED COMPOSITION AND PRODUCTION METHOD FOR SAME

(71) Applicant: Kirishima Highland Beer Co., Ltd., Kagoshima (JP)

(72) Inventor: Masahiro Yamamoto, Tokyo (JP)

(73) Assignee: Kirishima Highland Beer Co., Ltd., Kagoshima (JP)

( * ) Notice: Subject to any disclaimer, the term of this patent is extended or adjusted under 35 U.S.C. 154(b) by 0 days.

(21) Appl. No.: 14/401,604

(22) PCT Filed: Jul. 16, 2013

(86) PCT No.: PCT/JP2013/069268
§ 371 (c)(1),
(2) Date: Nov. 17, 2014

(87) PCT Pub. No.: WO2014/013976
PCT Pub. Date: Jan. 23, 2014

(65) Prior Publication Data
US 2015/0139958 A1    May 21, 2015

(30) Foreign Application Priority Data

Jul. 18, 2012 (JP) ................ 2012-159941
Mar. 22, 2013 (JP) ................ 2013-059632

(51) Int. Cl.
| | |
|---|---|
| *C12N 1/20* | (2006.01) |
| *A23K 1/00* | (2006.01) |
| *A23K 10/12* | (2016.01) |
| *A23K 50/10* | (2016.01) |
| *A23K 50/75* | (2016.01) |
| *A23K 50/30* | (2016.01) |

(52) U.S. Cl.
CPC .............. *A23K 1/007* (2013.01); *A23K 10/12* (2016.05); *A23K 50/10* (2016.05); *A23K 50/30* (2016.05); *A23K 50/75* (2016.05); *A23Y 2220/35* (2013.01)

(58) Field of Classification Search
None
See application file for complete search history.

(56) References Cited

U.S. PATENT DOCUMENTS

| | | | |
|---|---|---|---|
| 2002/0054935 A1* | 5/2002 | Yamamoto | B29C 45/2738 425/572 |
| 2008/0193588 A1 | 8/2008 | Yamamoto | |
| 2008/0317900 A1 | 12/2008 | Yamamoto | |

FOREIGN PATENT DOCUMENTS

| | | | |
|---|---|---|---|
| CN | 102100308 A | * | 6/2011 |
| EP | 1174041 A1 | | 1/2002 |
| JP | 04-131047 | | 5/1992 |
| JP | 2002-238466 | | 8/2002 |
| JP | 2006-238743 A | | 9/2006 |
| JP | 2008-178787 | | 8/2008 |
| PH | 26413 | * | 2/1992 |

OTHER PUBLICATIONS

Andersen et al., "Comparative genomics of citric-acid-producing Aspergillus niger ATCC 1015 versus enzyme-producing CBS 513. 88", Genome Research 2011, vol. 21, pp. 885-897.*
Japanese Office Action dated Jul. 5, 2016.

* cited by examiner

*Primary Examiner* — Michelle F Paguio Frising
(74) *Attorney, Agent, or Firm* — Haug Partners LLP; William S. Frommer

(57) ABSTRACT

Provided are a feed composition, which can be stored for a long time and is easily produced and adjustable in components, and which can increase the body weight and reduce a feed conversion ratio of farm animals to which the feed composition is fed, and a production method for the feed composition. In the feed composition, a liquid feed additive obtained by fermenting a carbohydrate-containing carbohydrate raw material by *Aspergillus* is substituted for 5 to 50% on a dry matter basis of a feed raw-material.

8 Claims, 12 Drawing Sheets

(a)

(a)

(b)

(a)

(b)

(c)

(a)

(b)

FEED COMPOSITION AND PRODUCTION METHOD FOR SAME

TECHNICAL FIELD

The present invention relates to a feed composition fed to animals raised mainly in farming and a production method for the feed composition.

BACKGROUND ART

It is desired that feeds used for livestock raising, particularly feeds for raising chickens and pigs satisfy high-level conditions such as high nutrition value and long storage life. As a feed satisfying such conditions, feeds obtained by fermenting raw materials by bacteria such as koji fungus (*Aspergillus*) have attracted attention and development of these feeds have been made.

For example, Patent Literature 1 by the present inventors discloses a method for producing a malt (koji)-blended feed, characterized by including blending *Aspergillus* with at least two types of raw materials selected from fiber feeds, grains and organic waste and growing *Aspergillus* therein. The malt-blended feed, which is provided by fermenting fiber feeds, grains and organic waste by *Aspergillus*, can facilitate fattening of farm animals without harmful effects such as ureteral stone and diarrhea, and improve quality of meat.

Patent Literature 2 by the present inventors discloses a method for treating food waste, which includes fermenting a raw material containing food waste by koji fungus to obtain a liquid material. The literature discloses that the koji fungus is a bacterium belonging to the genus *Aspergillus* and having an ability to produce citric acid; the liquid material contains citric acid produced by the *Aspergillus*; and the pH is 5.5 or less. The method for treating food waste is developed for using food waste as a feed, storing the feed without decay, and preventing reduction in quality of meat caused by oily components and reduction in growth caused by unstable components.

CITATION LIST

Patent Literature

Patent Literature 1: Japanese Patent Laid-Open No. 2002-142688
Patent Literature 2: Japanese Patent Laid-Open No. 2008-178787

SUMMARY OF INVENTION

Problems to be Solved by the Invention

According to the feed for farm animals and the production method of the feed disclosed in the Patent Literature 1, the farm-animal feed is prepared by fermentation with reduced water content in order to prevent decay. Therefore, if stirring of raw materials such as fiber feeds, grains and organic waste is not completely made, the raw material may not be sufficiently and uniformly fermented. In addition, to reduce the water content of the farm-animal feed, a long time is often required for fermentation.

Patent Literature 2 does not clearly describe as to whether the feed produced by the food-waste treatment method of Patent Literature 2 has an effect of improving the body weight and the feed conversion ratio of farm animals to which the feed was fed, compared to a conventional feed. It has been further desired that the feed for use in livestock raising have an effect of facilitating growth of farm animals, in other words, an effect of increasing body weight, and have an effect of reducing a feed conversion ratio.

Accordingly, an object of the present invention is to provide a feed composition which is prepared by fermenting a raw material sufficiently in a short time, can increase body weight and reduce a feed conversion ratio of farm animals to which the composition is fed.

Means for Solving the Problems

In the feed composition of the present invention, a liquid feed additive obtained by fermenting a carbohydrate-containing carbohydrate raw material by *Aspergillus* is substituted for 5 to 50% on a dry matter basis of a feed raw-material.

The feed composition of the present invention in which a liquid feed additive obtained by fermenting a carbohydrate raw material by *Aspergillus* is substituted for 5 to 50% on a dry matter basis of a feed raw-material increases the body weight and reduces a feed conversion ratio of farm animals to which the feed composition is fed. Since the feed additive is produced as a liquid feed, the raw material is uniformly and sufficiently fermented relatively in a short time. Since the feed additive is liquid, production can be easily made. In addition, since components other than the feed additive can be selected without limit, components for the feed can be appropriately controlled. Furthermore, since a feeder and transporting means using e.g., a pipe and a pump can be selected, cost for raising farm animals may be possibly reduced. Moreover, the feed composition containing the feed additive can be stored for a long time owing to the content of the component produced by fermentation of *Aspergillus*. As mentioned above, a feed composition, which increases the body weight and reduces a feed conversion ratio of farm animals, can be stably obtained and fed to farm animals.

*Aspergillus* to be used in the feed composition of the present invention is preferably *Aspergillus niger*. Since *Aspergillus niger* has an ability to produce citric acid, the pH of a culture solution is reduced as fermentation proceeds to keep the fermentation liquor acidic even if the pH is not controlled by any another means. For this reason, even if another asepticus means is not used, the feed additive and feed composition can be stored for a long time.

The feed additive preferably has a pH of 5.5 or less. If the feed additive is acidic, excessive proliferation of microorganisms other than *Aspergillus* can be suppressed and long-time storage of a feed additive itself can be made. Needless to say, a feed composition containing the feed additive can be stored for a long time.

The feed additive preferably contains 70% or more of water content. Since the feed additive is produced as a liquid feed having high water content, fermentation of a raw material can be made particularly uniformly and sufficiently in a relatively short time to obtain a feed additive. Since the liquid has low viscosity, it is easy to control, store and transport the feed additive and the feed additive can be easily produced even from a raw material basically having high water content.

The feed additive preferably contains Lactic acid bacteria. If *Aspergillus* is cultured together with Lactic acid bacteria, growth of both bacteria can be accelerated, with the result that stable fermentation can be performed, while suppressing proliferation of other molds and bacterium in the feed additive and feed composition. If a feed composition containing a feed additive obtained by co-culturing *Aspergillus* and Lactic acid bacteria is fed to farm animals, the enteral pH of the farm animals reduces and growth of harmful bacteria and parasitic insects in the entrails can be suppressed to keep the farm animals healthy.

A production method for the feed composition of the present invention includes adding *Aspergillus* to a carbohydrate-containing carbohydrate raw material, fermenting the carbohydrate raw material to which the *Aspergillus* is added to prepare a liquid feed additive, and substituting the feed additive for 5 to 50% on a dry matter basis of the feed raw-material.

The feed composition in which a liquid feed additive obtained by fermenting a carbohydrate raw material by *Aspergillus* is substituted for 5 to 50% on a dry matter basis of a feed raw-material increases the body weight and reduces a feed conversion ratio of farm animals to which the feed composition is fed. Since the feed additive is produced as a liquid feed, a raw material can be uniformly and sufficiently fermented relatively in a short time. Since the feed additive is liquid, production can be easily made. In addition, since components other than the feed additive can be selected without limit, components for the feed can be appropriately controlled. Furthermore, since a feeder and transporting means using e.g., a pipe and a pump can be selected, cost for raising farm animals may be possibly reduced. Moreover, the feed composition containing the feed additive can be stored for a long time owing to the content of the component produced by fermentation of *Aspergillus*. As mentioned above, a feed composition, which increases the body weight and reduces a feed conversion ratio of farm animals, can be stably obtained and fed to farm animals.

In the production method for the feed composition of the present invention, *Aspergillus niger* is preferably used as *Aspergillus*. In addition, fermentation is preferably performed such that the feed additive has a pH of 5.5 or less. Furthermore, fermentation is also preferably performed such that the water content of the feed additive becomes 70% or more. Moreover, a step of adding further Lactic acid bacteria to a carbohydrate raw material and fermenting the carbohydrate raw material is preferably included.

Effect of the Invention

According to the present invention, the feed composition in which a feed additive obtained by fermenting a carbohydrate raw material by *Aspergillus* is substituted for 5 to 50% on a dry matter basis of a feed raw-material increases the body weight and reduces a feed conversion ratio of farm animals to which the feed composition is fed. Since the feed additive is produced as a liquid feed, the raw material is uniformly and sufficiently fermented relatively in a short time. Since the feed additive is liquid, production can be easily made. In addition, since components other than the feed additive can be selected without limit, components for the feed can be appropriately controlled. Furthermore, since a feeder and transporting means using e.g., a pipe and a pump can be selected, cost for raising farm animals may be possibly reduced. Moreover, the feed composition containing the feed additive can be stored for a long time owing to the content of the component produced by fermentation of *Aspergillus*. Thus, a feed composition, which increases the body weight and reduces a feed conversion ratio of farm animals, can be stably obtained and fed to farm animals.

DESCRIPTION OF EMBODIMENTS

Figure 1:
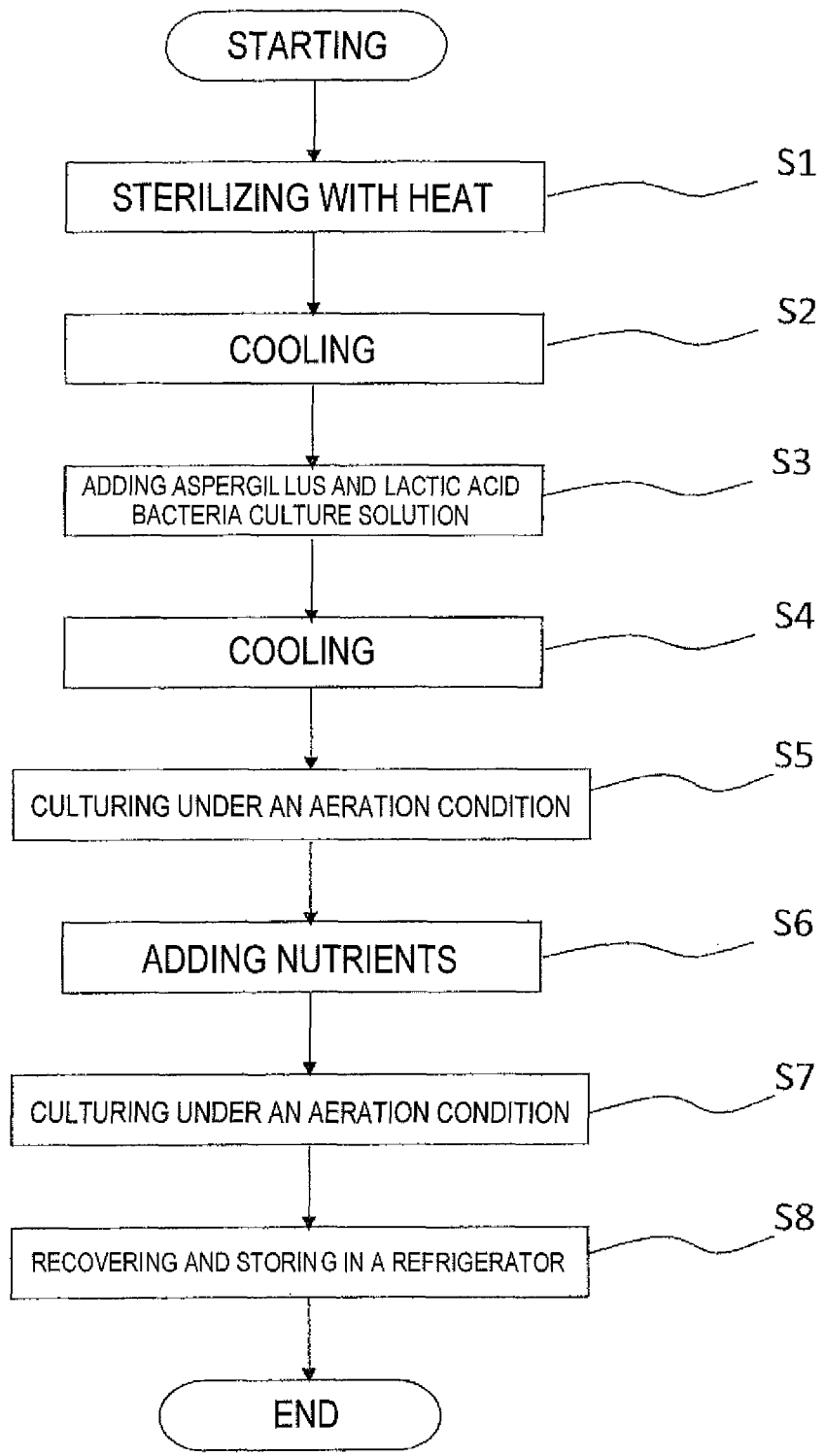
FIG. 1 is a flowchart for illustrating a method for producing a feed additive according to an embodiment of the present invention.

Embodiments of the present invention will be described below.

The feed composition of the present invention contains a predetermined amount of feed additive obtained by fermentation of a carbohydrate raw material. The feed additive is obtained by fermenting a carbohydrate-containing carbohydrate raw material by koji fungus (*Aspergillus*).

The carbohydrate raw material is not limited as long as it is a carbohydrate-containing raw material; however, it is preferable that the raw material substantially contains a carbohydrate as a main component. The carbohydrate used herein mainly refers to a sugar, particularly starch. It is desirable that the carbohydrate used herein is derived from, for example, grains, specifically, rice, wheat or corn, in view of quality of carbohydrate and availability. Furthermore, beans are favorably used as the carbohydrate raw material. Since not only carbohydrates but also a large amount of proteins are contained in beans, beans increase the nutrition value of the resultant feed composition. In this embodiment, as an example of the carbohydrate raw material, a material containing corn (1 to 30%), defatted soybean (1 to 10%) and water as the remainder is mentioned; however, the ratio and materials of these are not particularly limited and materials other than the aforementioned ones may be contained.

koji fungus (*Aspergillus*), which belongs to the genus *Aspergillus* and is also called koji mold, ferments a carbohydrate raw material. *Aspergillus* produces many types of enzymes including carbohydrate catabolic enzyme such as α-amylase, glucoamylase and α-glucosidase and proteases during fermentation. Owing to these enzymes, a carbohydrate contained in a carbohydrate raw material is decomposed to glucose and a protein is decomposed to amino acids. As the *Aspergillus*, particularly a bacterium belonging to the *Aspergillus* having an ability to produce citric acid is desirably used. If *Aspergillus* having an ability to produce citric acid is used, a feed additive (described later) having low pH due to citric acid produced can be obtained. Examples of such *Aspergillus* include *Aspergillus niger*, Asp. *Awamori* (for example, *Aspergillus kawachii*) and black *aspergillus*. Note that other *Aspergillus* such as Asp. *Oryzae* and Asp. *Sojae* may be used.

The feed additive is obtained by fermenting a carbohydrate raw material by such *Aspergillus*. In the feed additive, decomposition products such as glucose and amino acids, produced by decomposing a carbohydrate raw material through fermentation, various types of enzymes produced by *Aspergillus*, *Aspergillus* cells and its spores are contained. The pH of the feed additive is preferably 5.5 or less. Since pH is low, common bacteria hardly survive, and proliferation of other bacterium is low in producing a feed additive, with the result that the feed additive can be stored for a long time. Particularly preferably, pH is 4 or less. If *Aspergillus* such as *Aspergillus niger* having an ability to produce citric acid is used in fermentation, citric acid is produced simultaneously with fermentation of a carbohydrate raw material and can lower the pH of the feed additive suitably to 4 or less. Note that the pH of the feed additive can be adjusted alternatively by an acidic substance such as an organic acid.

The feed additive obtained by fermentation of a carbohydrate raw material by *Aspergillus* has a high water content, more specifically, 70% or more and further desirably 80% or more. In addition, the feed additive is a fluid having a viscosity of 5000 mPa·s or less. The liquid feed additive has a high quality since fermentation with *Aspergillus* takes place in all over the carbohydrate raw material and the liquid feed additive becomes uniformly acidic, providing a storage effect. Particularly, the water content during fermentation is desirably 70 wt % or more.

When a carbohydrate raw material is fermented by *Aspergillus*, it is also preferable that Lactic acid bacteria is further added and *Aspergillus* and Lactic acid bacteria are co-cultured. If *Aspergillus* and Lactic acid bacteria are co-cultured, growth of bacteria is mutually facilitated, contributing to not only stable fermentation but also suppression of other bacterium growth in a feed additive and a feed composition. In addition, since Lactic acid bacteria produce an organic acid from glucose produces by decomposition of carbohydrate by *Aspergillus*, Lactic acid bacteria has a function of reducing the pH of the feed additive. As the Lactic acid bacteria, Lactic acid bacteria used in a fermented lactic feed can be used; more specifically, *Lactobacillus furmentum*, etc. are mentioned. In the feed additive obtained by fermentation by *Aspergillus* and Lactic acid bacteria, decomposition products including glucose, amino acids and organic acids obtained by decomposition of a carbohydrate raw material through fermentation and a plurality of types of enzymes produced by *Aspergillus* and Lactic acid bacteria are contained. Besides these, *Aspergillus* cells, its spores and Lactic acid bacteria cells are contained.

The feed additive may also contain other materials for making up for glucose, which was consumed when *Aspergillus* ferments a carbohydrate raw material for growth, and for adjusting other nutrients. For example, proteins, fats and oils and sugars can be added for controlling gross energy (GE) of a feed composition. In particular, soybean oil is favorably added. Furthermore, proteins for growth of *Aspergillus*, for example, defatted soybean, may be contained and spores of *Aspergillus* may be added.

In the feed composition of the present invention, the aforementioned feed additive is substituted for 5 to 50 wt % on a dry matter basis of a feed raw-material. "Dry matter basis" refers to the weight of dry matter obtained by removing water; however, an approximate value extrapolated from the water contents of a feed raw-material and a feed additive may be used. If the amount of feed additive substituted for the feed raw-material exceeds the above range, an effect of increasing the body weight and reducing a feed conversion ratio of farm animals to which the feed composition was fed cannot be obtained. Furthermore, the desirable amount of feed additive substituted for the feed raw-material is properly 1 to 50 wt % both in birds and in mammals. The amount at which a maximum effect can be obtained varies depending upon the type of farm animal to which the feed is fed. For example, the amount is 10 to 20 wt % in birds and 15 to 25% in mammals. If the amount falls within the ranges, particularly, an increase in body weight is observed.

A feed raw-material can be appropriately selected from the feeds known in the art. For example, feeds mainly based on cereals, chaff and bran, oil cake and skim milk powder, and blended feed composed of a plurality of these or those to which inorganic substances are added may be selected. Further, to the feed raw-material, other nutrients (additives) may be appropriately added. In this embodiment, a commercially available general feed blend is used.

The feed composition of the invention has an effect of greatly increasing body weight on birds, more specifically chickens, even if chickens are not less than 15 days old. In other words, the feed composition is expected to have an effect of facilitating growth on chickens even if growth of their organs is almost completed.

Now, a production method for a feed composition is shown in FIG. 1 and will be described.

First, a feed additive is prepared. In the beginning, a carbohydrate raw material is fermented by *Aspergillus*. Carbohydrate can be appropriately fermented in accordance with a method appropriately known in the art. In this embodiment, 5 to 10 parts by weight of carbohydrate raw material derived from corn, 2 to 5 parts by weight of dried and heated soybean, and 85 to 93 parts by weight of water are mixed and used as a carbohydrate raw material. The carbohydrate raw material is heat-sterilized at 95° C. or more for at least one hour (step S1). Next, the carbohydrate raw material is sufficiently cooled to room temperature to about 40° C. (step S2) and *Aspergillus* is added to the carbohydrate raw material and fermentation is performed (step S3).

In this embodiment, seed malt (seed koji) is used as *Aspergillus* and the seed malt is added at a rate of at least $10^8$ spores per carbohydrate raw material (1 kg). Furthermore, in this embodiment, fermentation is performed by *Aspergillus* and, in addition, by adding a culture solution of Lactic acid bacteria, in which bacterial cells are proliferated as sufficient as possible to reach at least $10^8$ cells. The fermentation liquor thus obtained is cooled to room temperature to about 30° C. (step S4) and cultured under an aeration condition for 12 hours to several days (step S5).

In the step where *Aspergillus* and Lactic acid bacteria are sufficiently grown and fermentation of the carbohydrate raw material proceeds to some extent, if necessary, glucose consumed by *Aspergillus* for growth is made up for and other nutriments are adjusted. In this embodiment, as a nutrient for adjusting gross energy (GE) of the feed composition, a vegetable fat and oil is added in an amount of 1 to 3 parts by weight relative to the starting carbohydrate raw material (step S6). Thereafter, culture under an aeration condition is performed in the same manner as above (step S7). After that, spores of *Aspergillus* may be added. Note that if final adjustment of nutrient components is performed in step S6, and the steps on and after step S7 may be omitted.

The feed additive thus produced can be stored in the refrigerator (step S8).

The feed additive can be directly used as a liquid feed; however in this embodiment, the feed additive prepared as mentioned above is substituted for 5 to 50 wt % on a dry matter basis of a feed raw-material containing components such as other feeds to prepare a feed composition. The feed additive may be mixed with the other components at the time of feeding to farm animals or the feed additive and the other components are separately fed to farm animals such that the amounts of intake satisfy the aforementioned substitution ratio. Alternatively, in feeding, the feed additive may be concentrated, more specifically, concentrated under vacuum in order to reduce the water content to obtain a solid feed additive, which may be mixed so as to satisfy the aforementioned substitution ratio on a dry matter basis.

Since the feed additive is a liquid state or a concentrate of a small volume, it is easy to adjust components by adding it to other feed raw-materials. In addition, the feed additive can be applied to a feeder and transporting means using e.g., a pipe and a pump and can be fed to farm animals in various ways, e.g., fed to farm animal directly as a liquid or by sprinkling over a feed raw-material. Thus, the feed additive is very convenient in feeding and can contribute to cost reduction.

EXAMPLES (Preparation of Feed Additive)

As a carbohydrate raw material, steam-flaked corn A95 (7.04 kg), defatted soybean (2.72 kg) and water (68.64 L) were mixed, subjected to heat sterilization performed at 95° C. for one hour and cooled to 40° C. To the carbohydrate raw material, a seed malt of *Aspergillus* such as *Aspergillus niger* (80 g) was added such that at least $10^8$ spores of *Aspergillus* were present per carbohydrate raw material (1 kg). Furthermore, a culture solution of *Lactobacillus furmentum* (80 ml) was added and the resultant mixture was cooled to 30° C. and cultured under an aeration condition at 30° C. for 24 hours to perform fermentation. To the resultant fermentation liquor, soybean oil (1.6 kg) was added in order to control gross energy (GE) of the feed composition to obtain a feed additive. The components of the feed additive were analyzed. The results were shown in Table 1.

TABLE 1

| | pH | Number of *Aspergillus* cells | Number of *Lactobacillus* cells | Number of *Escherichia coli* cells | Crude protein (%) | GE (Mcal/kg) |
|---|---|---|---|---|---|---|
| per Raw material | 3.74 | $1.0 \times 10^6$ | $2.0 \times 10^8$ | Not detected | 1.90 | 0.68 |
| per Dry matter | — | — | — | — | 13.87 | 4.99 |

(Feeding Test)

Figure 4:
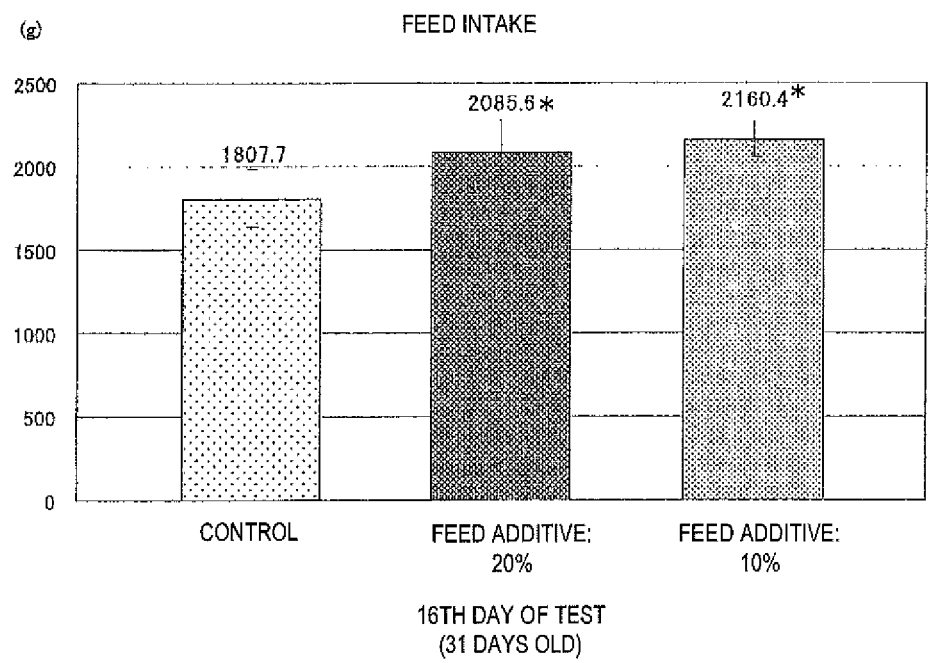
FIG. 4 is a graph showing the amount of feed intake of farm animals (chickens) when the feed composition according to the same Example as in FIG. 2 was fed.
Figure 5:
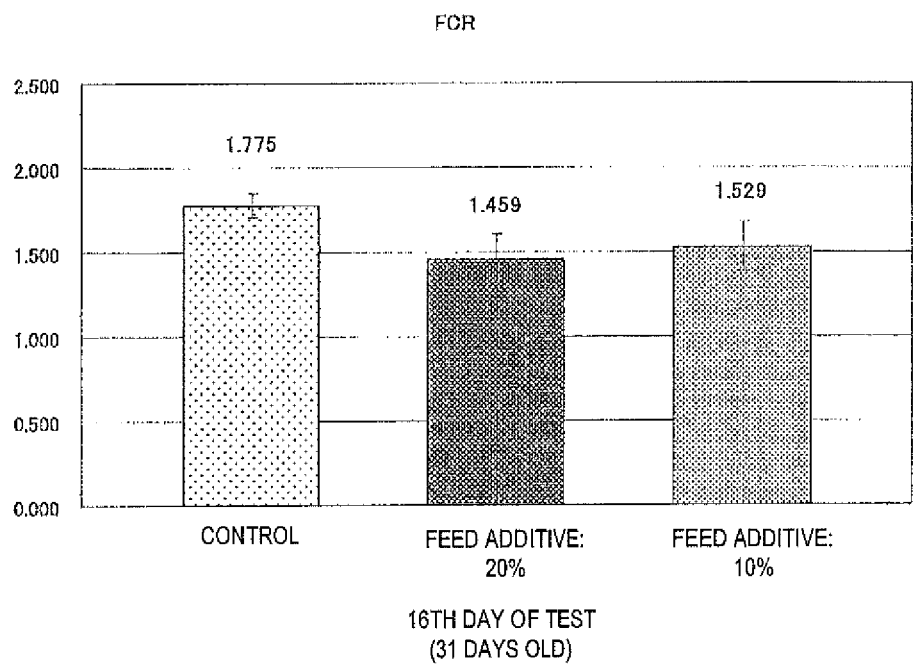
FIG. 5 is a graph showing FCR of farm animals (chickens) when the feed composition according to the same Example as in FIG. 2 was fed.

In feeding chickens (broilers) of 15 days old, a predetermined amount of feed additive was sprayed into a feed raw-material using corn as a main component in a feed bucket, and a feed composition in which the feed additive was substituted for 10 wt % or 20 wt % on a dry matter basis of the feed raw-material was experimentally fed to the chickens. A control (the same as the feed raw-material, i.e., a commercially available feed blend) and the feed composition in which the feed additive was substituted for the feed raw material (10 wt % or 20 wt %) were fed to each of 9 chickens of 15 days old for 16 days (up to 31 days old). The body weight change is shown in FIG. 2, rate of weight gain in FIG. 3, amount of feed intake in FIG. 4 and feed conversion ratio in FIG. 5 by this test, respectively.

Figure 2:
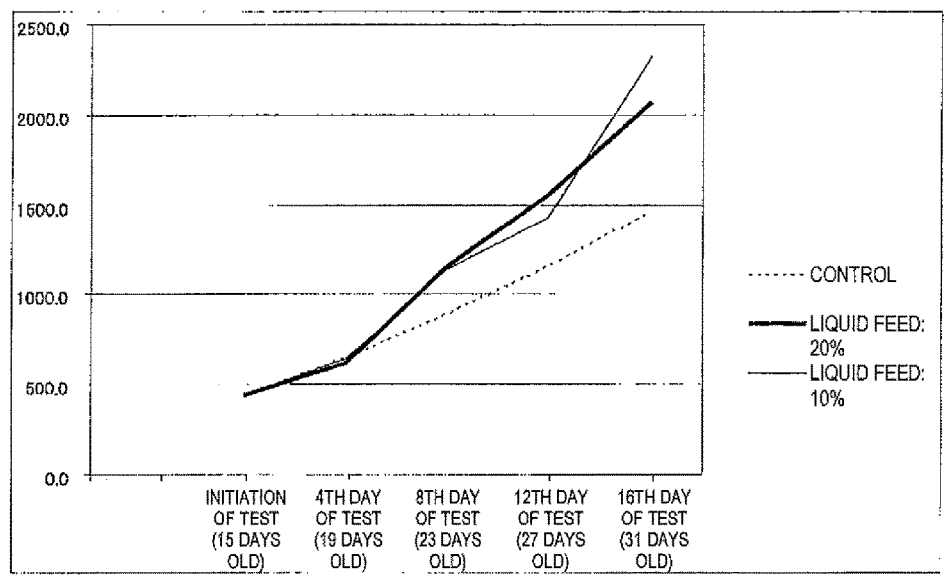
FIG. 2 is a graph showing a change in body weight of farm animals (chickens) to which a feed composition according to an Example of the present invention was fed.
Figure 3:
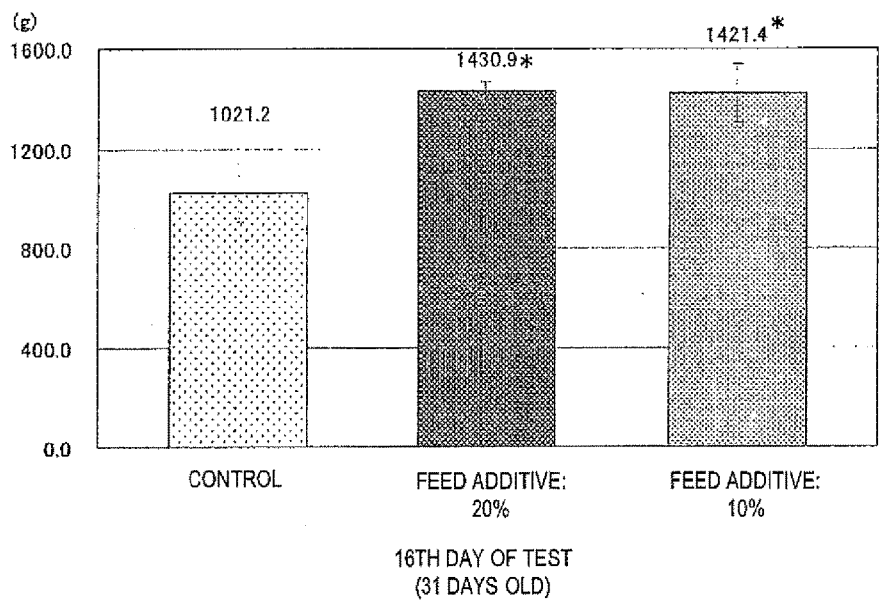
FIG. 3 is a graph showing an increase in body weight of farm animals (chickens) to which the feed composition according to the same Example as in FIG. 2 was fed.

From FIG. 2, it was found that the body weight of chickens to which the feed composition in which the feed additive was substituted for 10 wt % or 20 wt % of the feed raw-material was fed significantly increased compared to the control. The increase ratio finally reached about 140%, as shown in FIG. 3. From FIG. 4 and FIG. 5, it was found that the feed intake of each of the feed compositions in which the feed additive was substituted for 10 wt % and 20 wt % of the feed raw-material, respectively, is larger than that of the control; whereas the feed conversion ratio (FCR) of each of them is lower than that of the control. As these results, it was found that the feed composition of the Example significantly increases the body weight of the farm animals to which the feed composition was fed; however, the feed conversion ratio thereof is lower than that of a commercially available conventional feed blend. In other words, it was demonstrated that the amount of feed required for increasing the body weight can be reduced; whereas fattening is facilitated.

(Effect of Facilitating Bacterial Growth by Combination Use of Bacterial Strains)

Figure 6:
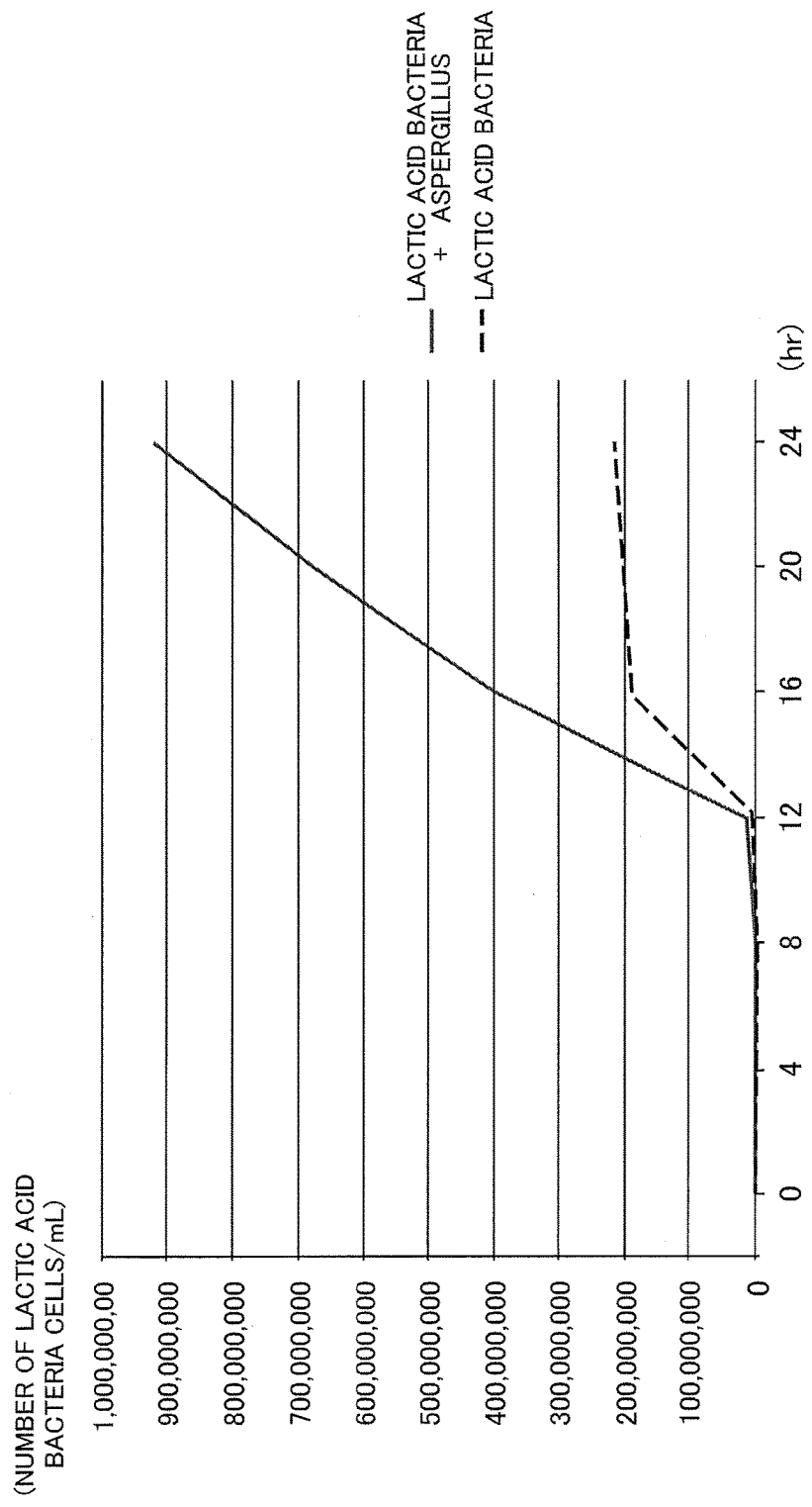
FIG. 6 is a graph showing a growth rate of Lactic acid bacteria when *Aspergillus* and Lactic acid bacteria were co-cultured.

To water, steam-flaked corn A95 (5%) was added and sterilized to obtain a broth. To this, Asp. *Awamori* and Lactic acid bacteria were added such that the concentrations of them reached 0.1 wt % respectively. The mixture was cultured for 24 hours. Another sample was prepared by adding Lactic acid bacteria alone so as to obtain a concentration of 0.1 wt %. The same treatment as above was applied to this. The number of Lactic acid bacteria cells/ml of each of the samples is shown in FIG. 6. From FIG. 6, it was found that the case where Lactic acid bacteria is present together with *Aspergillus*, Lactic acid bacteria grows 9 times or more as large as the case where Lactic acid bacteria is present alone. This indicates that a lactic fermentation period of at least 3 days was required in a conventional livestock raising; whereas 24 hours is sufficient in the case where *Aspergillus* is used in combination.

(Feeding Test by Feed Obtained by Using Bacterial Strains in Combination)

Figure 7:
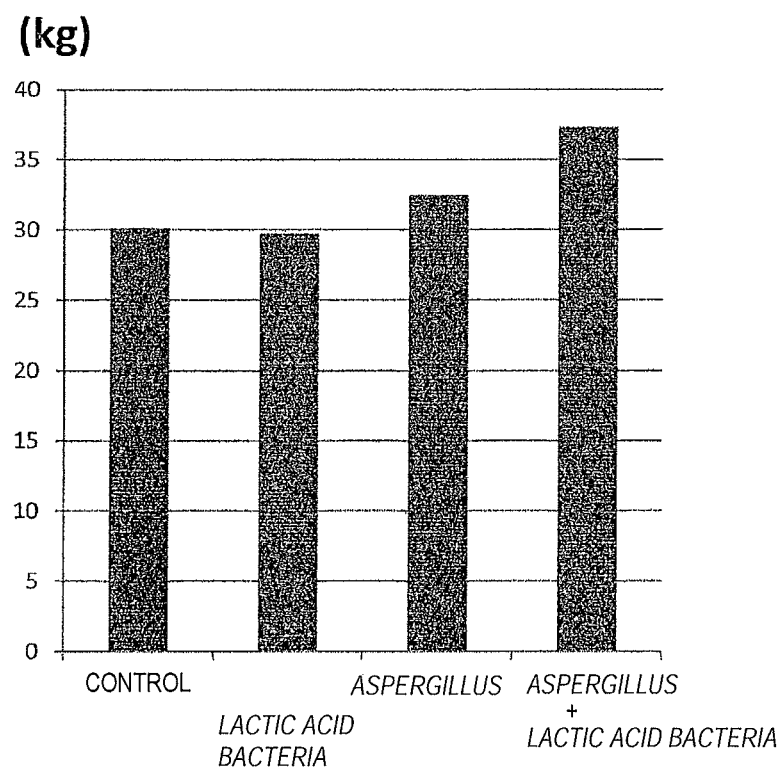
FIG. 7 is a graph showing an increase in body weight of farm animals (pigs) when the feed composition obtained by co-culturing *Aspergillus* and Lactic acid bacteria was fed.
Figure 8:
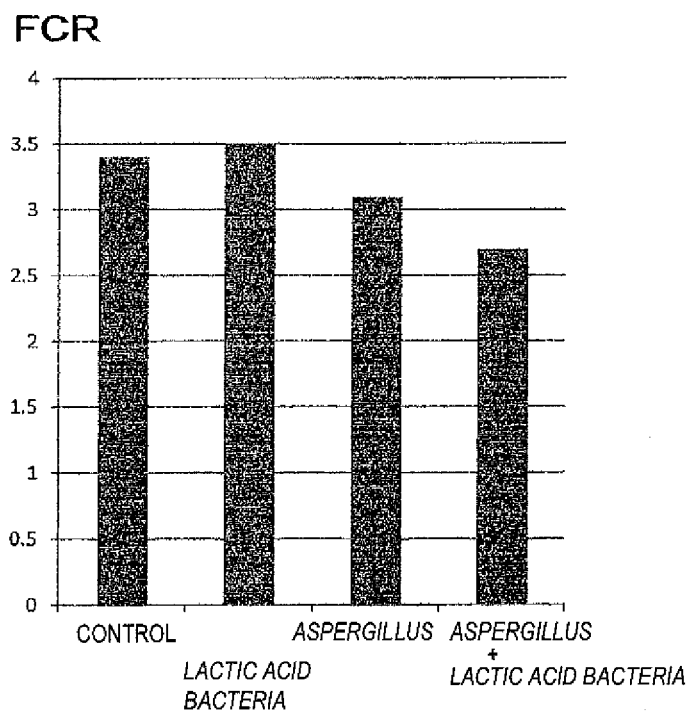
FIG. 8 is a graph showing a feed conversion ratio by the same pigs as in FIG. 7.

As a carbohydrate raw material, a commercially available solid feed blend was diluted in water so as to obtain a concentration of 20 wt %. A feed sample adding no bacterial cells (control), a sample adding 0.1 wt % of Lactic acid bacteria (Lactic acid bacteria), a sample adding 0.1 wt % of *Aspergillus* (*Aspergillus*) and a sample adding 0.1 wt % of *Aspergillus* and 0.1 wt % of Lactic acid bacteria (*Aspergillus* +Lactic acid bacteria) were prepared and cultured for 24 hours. The obtained liquid feeds were fed to pigs. Weight gain is shown in FIG. 7 and feed conversion ratio is shown in FIG. 8.

These results show that weight gain and feed conversion ratio overwhelming those of conventional feed blend can be attained by feeding a fermented liquid feed, which was obtained by culturing a mixture of *Aspergillus* and Lactic acid bacteria, to pigs. The same effect can be presumably obtained even if a liquid feed is prepared from a feed blend, a non-blend feed or food residue while controlling water content to 75 wt % or more and put in use.

Figure 9:
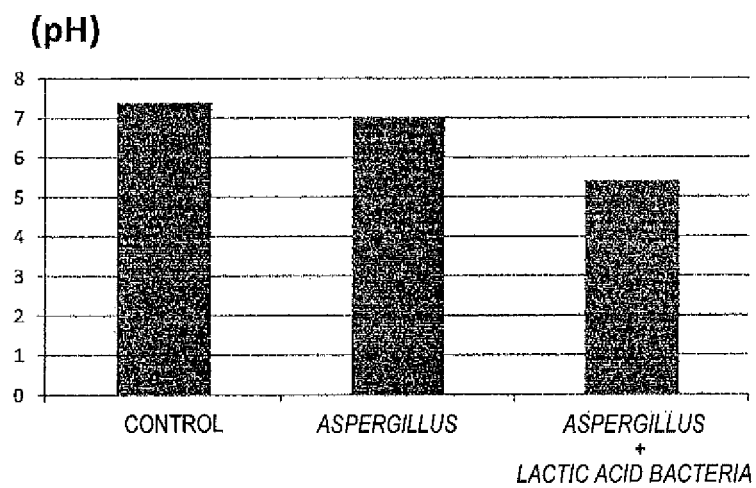
FIG. 9 is a graph showing the result of pH measurement of excrement in the same pigs as in FIG. 7.
Figure 10:
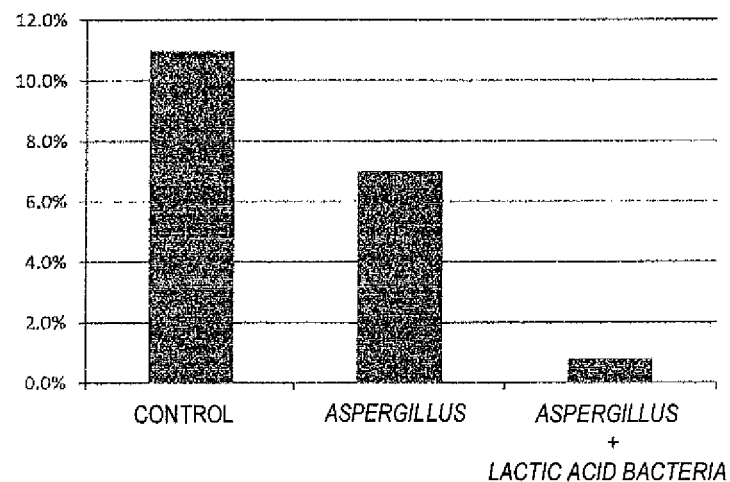
FIG. 10 is a graph showing the mortality of the same pigs as in FIG. 7.
Figure 11:
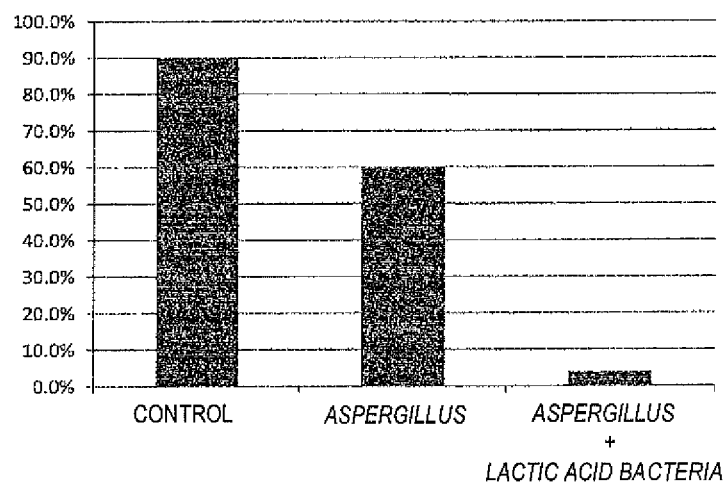
FIG. 11 is a graph showing wastage rate of entrails of the same pigs as in FIG. 7.

After feeding, pig's excrement was collected and pH of the excrement of pigs, to which the control, the *Aspergillus*, and the *Aspergillus* +Lactic acid bacteria samples were fed, was measured. The results are shown in FIG. 9. The results of FIG. 9 show that the excrement of pigs fed by the feed containing a liquid culture obtained by culturing a mixture of *Aspergillus* and Lactic acid bacteria, had a pH of 6 or less. In FIG. 10, the mortality of pigs (1200 pigs) having a body weight of 20 kg to 80 kg in a fattening period after feeding is shown, and the wastage rate of entrails is shown in FIG. 11. The results of FIG. 10 and FIG. 11 show that the mortality and wastage rate of entrails are low in pigs fed by the feed obtained by a liquid culture of a mixture of *Aspergillus* and Lactic acid bacteria.

Usually, the feed taken by a pig is sterilized by gastric acid at about pH 2 and then controlled to have a pH of about 6 by sodium bicarbonate secreted from the pancreas. The pH of the digested feed gradually increases to about pH 7 by the time the digested feed reaches the large intestine where *E. coli* and *Salmonella* live. However, from the aforementioned results, it was found that the pH of 6 or less is maintained even in the large intestine because the feed of *Aspergillus* and Lactic acid bacteria mixed culture solution is fed. Because of this, generation of harmful bacteria and roundworm within the intestine can be suppressed and visceral diseases can be prevented, with the result that the mortality of farm animals decreases and the health conditions of farm animals can be maintained.

(Feeding Test for Pig)

A feed additive (Example 2) was prepared by replacing the steam-flaked corn and defatted soybean, which were used in Example 1 as the carbohydrate raw material, for the feed additive by defatted rice bran (2 wt %); adding a starter culture at the time of initiating fermentation; and performing fermentation under an aerobic condition for 16 hours and under an anaerobic condition for 8 hours. At this time, two types of Lactic acid bacteria cells obtained in different batches were added to prepare liquid feeds, i.e., liquid A and liquid B, respectively. The pH, water content, crude proteins and GE of liquid A and liquid B are shown in Table 2.

TABLE 2

|  | pH | Water content (%) | Crude protein (%) | GE (Mcal/kg) |
|---|---|---|---|---|
| Liquid feed A | 3.51 | 86.0 | 2.3 | 0.90 |
| Liquid feed B | 3.93 | 82.7 | 3.1 | 1.03 |

Liquid A and B in accordance with the formulations shown in Table 3 for Control, LFA and LFB plots were fed to each of six pigs (neutered males, Kagoshima Berkshire, individual feeding). In feeding, restricting feeding was employed but water intake was not limited. More specifically, a commercially available feed blend for fattening was fed until body weight reached 66 to 74 kg, and thereafter test feeds corresponding to the feeding plots shown in Table 3 were fed until body weight reached 110 kg. The pigs were shipped when the body weight reached a target weight of 110 kg and slaughtered at a slaughtering center. On the following day, carcass weight, backfat thickness, the length of pork loin and weight of pork loin were measured.

TABLE 3

|  | Control plot | Liquid A feeding plot | Liquid B feeding plot |
|---|---|---|---|
| Feed blend | 3.00 |  |  |
| Liquid A |  | 3.36 |  |
| Liquid B |  |  | 3.56 |
| Flaked corn |  | 2.47 | 2.43 |
| Alfalfa meal |  | 0.13 | 0.13 |
| Defatted soybean |  | 0.08 | 0.11 |
| CP (g) | 345.00 | 345.06 | 345.01 |
| GE (Mcal/kg) | 13.88 | 13.87 | 13.88 |

Figure 12A:
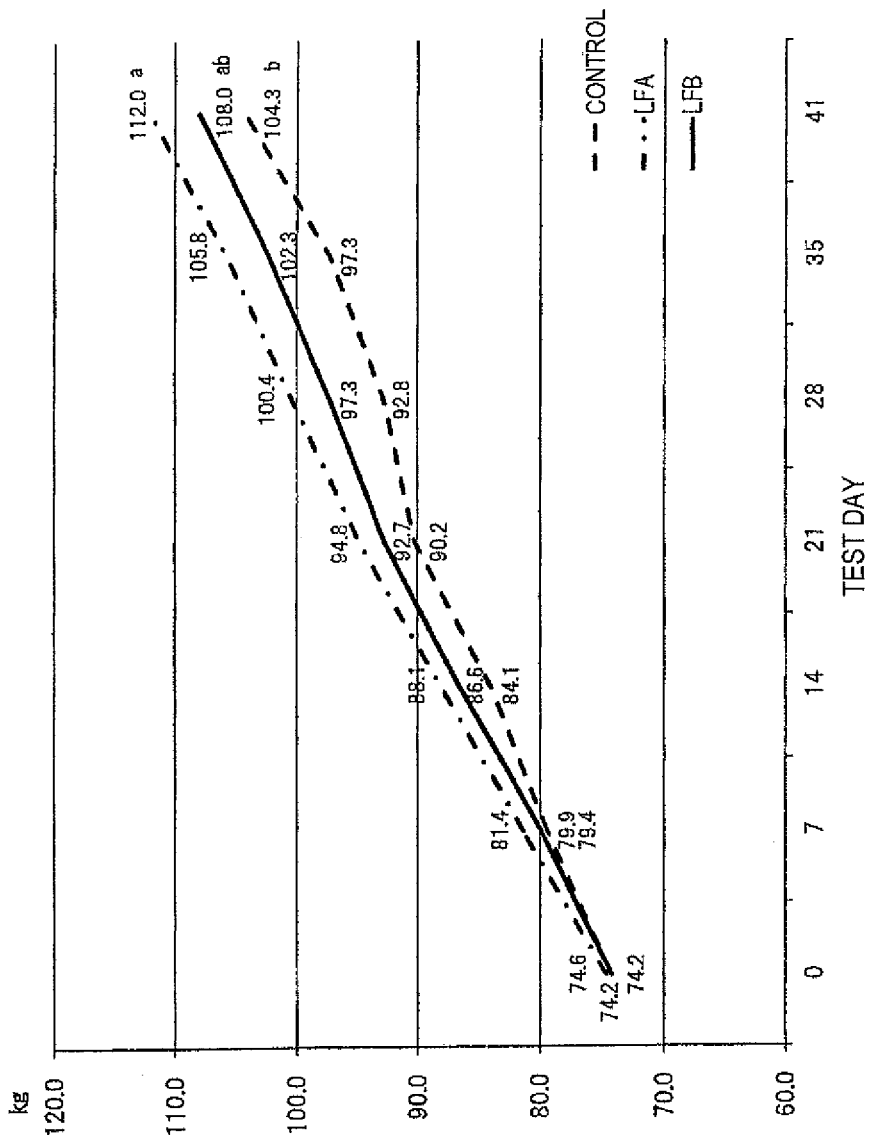
FIG. 12 shows a graph (a) showing body-weight change compared between individual feeding plots in the pig feeding test of the present invention and a graph (b) showing the measurement results of increase in body-weight.
Figure 12B:
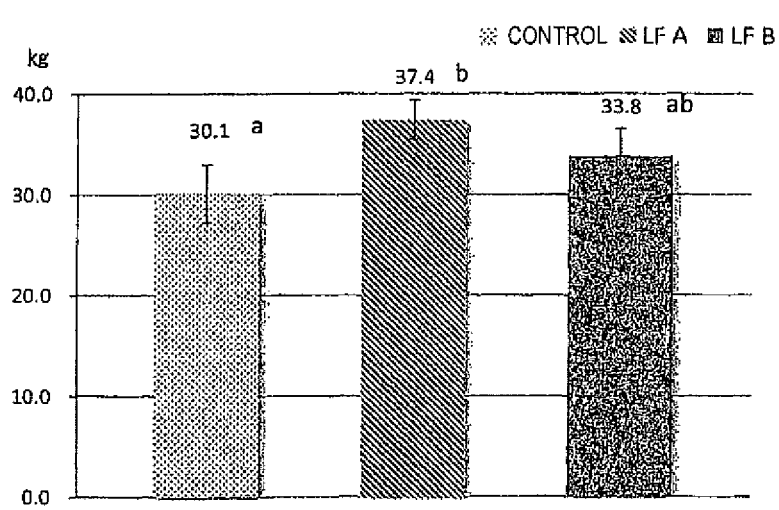

In each feeding plot, measurement results of body-weight change are shown in FIG. 12 (*a*), and measurement results of increased body weight are shown in FIG. 12 (*b*). The body-weights of the pigs in both LFA and LFB plots significantly increased compared to those in the control plot.

Figure 13:
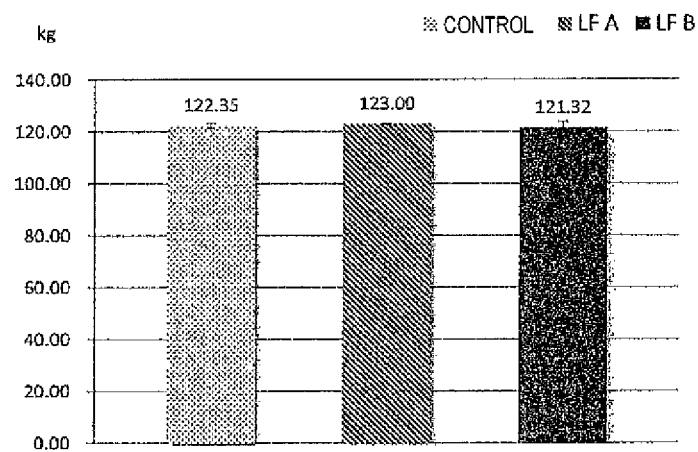
FIG. 13 shows a graph (a) showing the measurement results of feed intake and a graph (b) showing the measurement results of FCR in individual feeding plots of FIG. 12.
Figure 13:
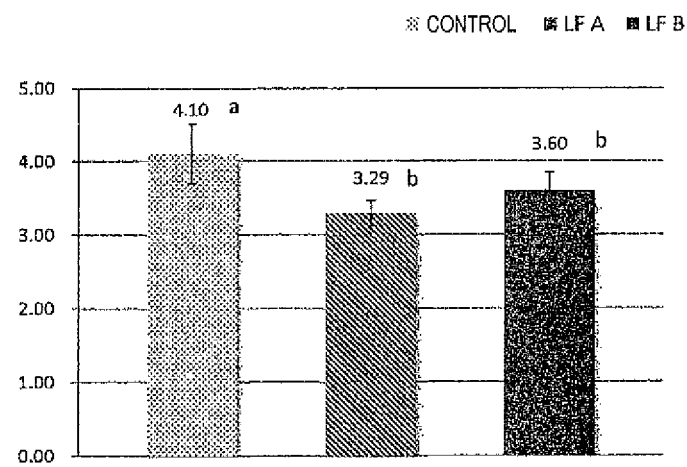

Amount of feed intake was measured in the feeding plots and the results are shown in FIG. 13 (*a*). FCR was measured in the feeding plots and the results are shown in FIG. 13 (*b*). In all plots, the same amount of feed was fed (restricted feeding) and the amounts of feed intake in the LFA and LFB plots were the same as in the control plot. However, feed conversion ratios (FCR) of them were lower than the control plot. From these results, it was demonstrated that the feed composition significantly increases the body weight of farm animals to which the feed composition was fed; however, feed conversion ratios are almost equal; in other words, the feed composition further facilitates fattening per feed amount.

Figure 14:
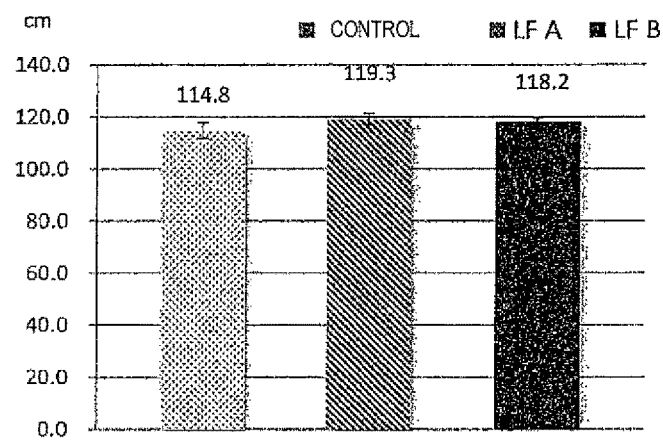
FIG. 14 shows a graph (a) showing the measurement results of body length at the time of shipping, a graph (b) showing the measurement results of carcass weight and a graph (c) showing the measurement results of backfat thickness in individual feeding plots of FIG. 12.
Figure 14:
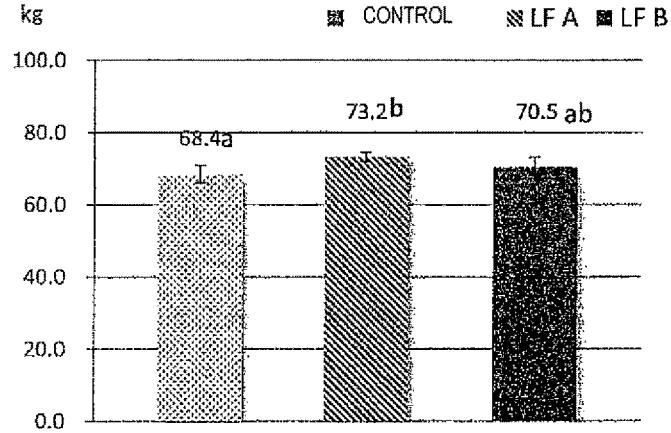
Figure 14:
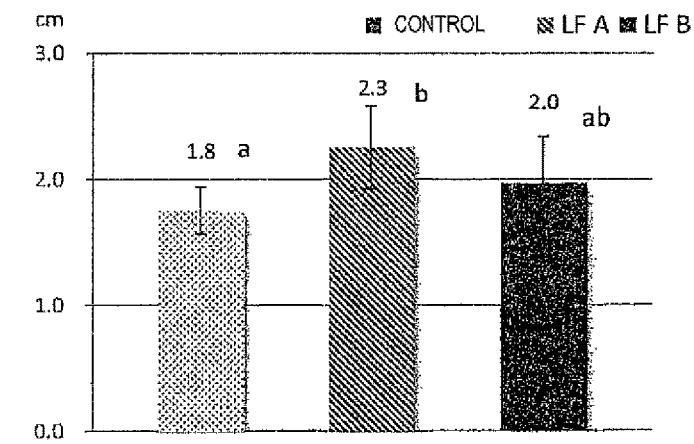

Body length was measured in the feeding plots at the time of shipping. The results are shown in FIG. 14 (*a*). The measurement results of carcass weight are shown in FIG. 14 (*b*); and the measurement results of backfat thickness are shown in FIG. 14 (*c*). The body length, carcass weight and backfat thickness in each of LFA and LFB plots were larger than those of the control plot. Form these results, it was demonstrated that the feed composition further facilitates fattening of farm animals.

Figure 15:
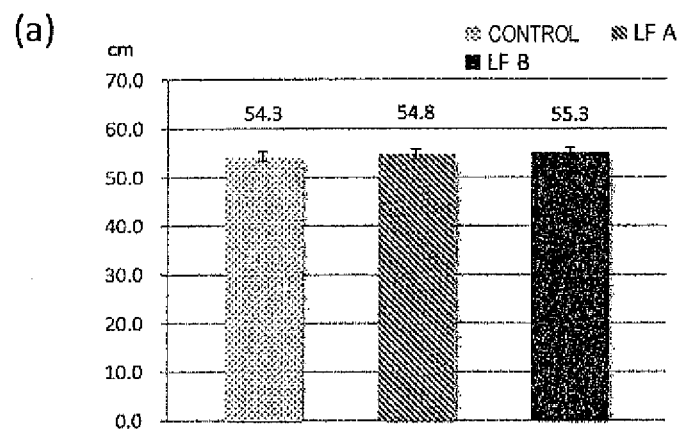
FIG. 15 shows a graph (a) showing the measurement results of loin length and a graph (b) showing the measurement results of loin weight in individual feeding plots of FIG. 12.
Figure 15:
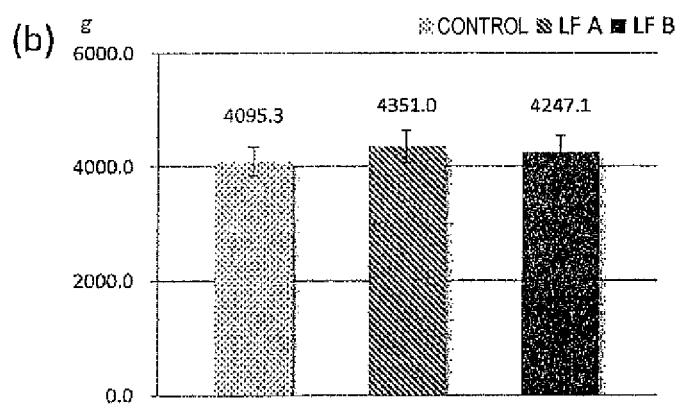

The measurement results of pork-loin length in the feeding plots are shown in FIG. 15 (*a*); and the measurement results of pork loin weight are shown in FIG. 15 (*b*). The pork-loin length and pork loin weight in each of LFA and LFB plots were significantly larger than those of the control plot. Form these results, it was demonstrated that the feed composition further facilitates fattening of farm animals.

Figure 16:
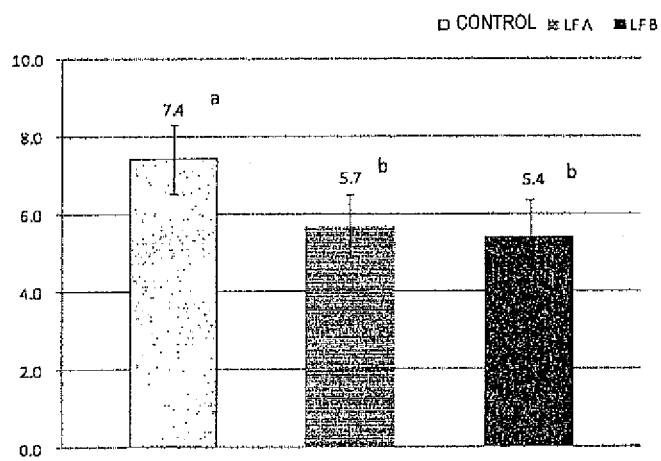
FIG. 16 shows a graph showing the measurement results of pH of excrement in individual feeding plots of FIG. 12.

The measurement results of pH of pig's excrement in the feeding plots are shown in FIG. 16. The results of FIG. 16 show that pH of excrement in each of the LFA and LFB plots is 6 or less. The results demonstrate that since intestinal pH is acidic, generation of harmful bacteria and roundworm within the intestine can be suppressed and the health conditions of farm animals can be maintained.

The embodiments mentioned above are just examples of the present invention and do not show the invention in a limited way. The present invention can be modified in various ways and various embodiments exist. Accordingly, the range of the present invention is only defined by the Claims and the equivalent scope thereof.

INDUSTRIAL APPLICABILITY

The present invention is useful in a wide variety of fields including the livestock industry, feed-processing industry, industries related to storage, treatment and application of excessive organic waste.

The invention claimed is:

1. A production method for a feed composition comprising
adding only *Aspergillus* and *Lactobacillus* as fermentation bacteria to a carbohydrate-containing carbohydrate raw material;
fermenting the carbohydrate raw material via co-culturing of the *Aspergillus* and the *Lactobacillus* together under an aeration condition to prepare a liquid feed additive; and
substituting 10 to 50% of a feed raw material on a dry matter basis with the liquid feed additive.

2. The production method for a feed composition according to claim 1, wherein the *Aspergillus* is *Aspergillus niger*.

3. The production method for a feed composition according to claim 1, wherein the fermentation is performed such that pH of the feed additive becomes 5.5 or less.

4. The production method for a feed composition according to claim 1, wherein the fermentation is performed such that the water content of the feed additive becomes 70% or more.

5. The production method for a feed composition according to claim 1, wherein the fermentation is performed such that *Aspergillus* and *Lactobacillus* are co-cultured under an aeration condition for 12 to 24 hours.

6. The production method for a feed composition for reducing a feed conversion ratio or wastage rate of entrails comprising:
adding only *Aspergillus* and *Lactobacillus* as fermentation bacteria to a carbohydrate-containing carbohydrate raw material;
fermenting the carbohydrate raw material via co-culturing of the *Aspergillus* and the *Lactobacillus* together under an aeration condition to prepare a liquid feed additive; and
substituting 10 to 50% of a feed raw material on a dry matter basis with the liquid feed additive.

7. The production method for a feed composition for reducing a feed conversion ratio or wastage rate of entrails according to claim 6, wherein the *Aspergillus* is *Aspergillus niger*.

8. The production method for a feed composition for reducing a feed conversion ratio or wastage rate of entrails according to claim 6, wherein the fermentation is performed such that *Aspergillus* and *Lactobacillus* are co-cultured under an aeration condition for 12 to 24 hours.

* * * * *